(No Model.)

F. H. HOYT.
WASTE PIPE CLEANER.

No. 550,914. Patented Dec. 3, 1895.

Attest
Wm. F. Hall
F. L. Middleton

Inventor
Frank H. Hoyt
by Ellis Spear
Atty.

UNITED STATES PATENT OFFICE.

FRANK H. HOYT, OF SHARON, PENNSYLVANIA.

WASTE-PIPE CLEANER.

SPECIFICATION forming part of Letters Patent No. 550,914, dated December 3, 1895.

Application filed January 12, 1895. Serial No. 534,694. (No model.)

*To all whom it may concern:*

Be it known that I, FRANK H. HOYT, a citizen of the United States, residing at Sharon, in the county of Mercer and State of Pennsylvania, have invented certain new and useful Improvements in Waste-Pipe Cleaners, of which the following is a specification, reference being had therein to the accompanying drawings.

My invention relates to cleaners for drain-pipes leading from washbowls and the like wherein the stream of water from the supply-cock is contracted in size and augmented in force, so as to remove any obstruction from the drain-pipe. This object is obtained by attaching one end of a hose to the supply-cock and its opposite end to the discharge-opening in the washbowl in the manner to be described hereinafter and forcing a stream of water through the said pipe, a gasket being interposed between the discharge end of the hose and the opening in the bowl to prevent leakage.

I have illustrated my invention in the accompanying drawings, in which—

Figure 1:
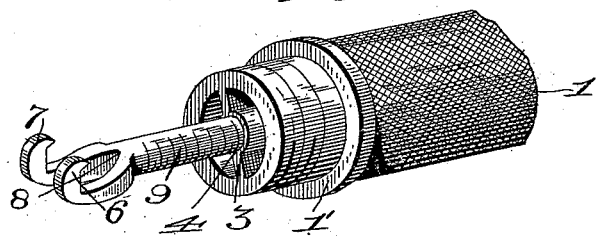
Figure 2:
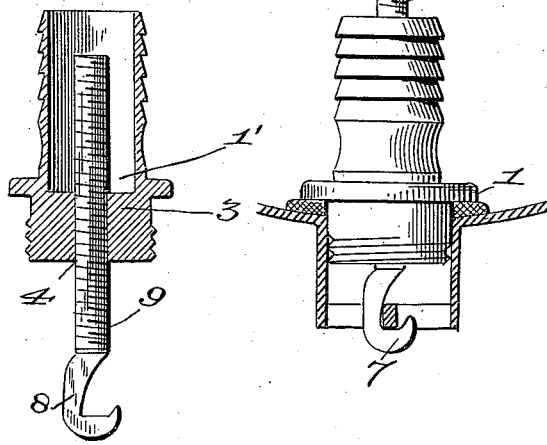
Figure 3:
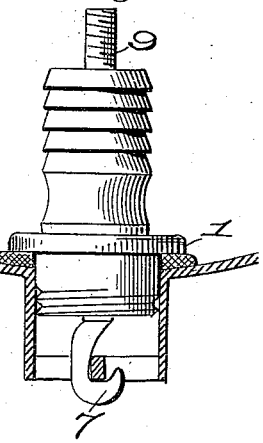

Figure 1 is a perspective. Fig. 2 is a longitudinal section. Fig. 3 is a view showing the device in position.

The supply-hose is shown at 1, carrying at one end the nipple 1' of ordinary construction, with the exception that across the mouth of the nipple and extending a short distance within the same is the partition 3, having an enlarged central portion provided with a threaded opening 4, extending entirely therethrough. In connection with this nipple I use the hook consisting of the forked arm 8 and the shank 9, adapted to be screwed within the opening 4 in the nipple. In this manner the nipple and hook are capable of being adjusted in relation to each other.

When using this device for cleaning drain-pipes, I first place a gasket over the discharge-opening in the bowl, this gasket having a central opening which when in position registers with the said opening in the bowl. The hook is then screwed out of the nipple a sufficient distance to allow of it being brought into engagement with the bottom of the cross-bars arranged in the opening in said bowl by passing each of the arms 6 7 through the perforations between the same. The nipple 1' is then screwed down on the shank and effectually clamps itself and the gasket interposed between the opening and the nipple in position. The opposite end of the hose is then attached to the supply-cock and the water turned on.

What I claim is—

In combination the hose, the nipple, the strainer, the gasket partly covering the same and the hook extending axially from said nipple for clamping said gasket and nipple to said strainer, substantially as described.

In testimony whereof I affix my signature in presence of two witnesses.

FRANK H. HOYT.

Witnesses:
LEVI HIGGINS,
A. W. WILLIAMS.